Figure 1:
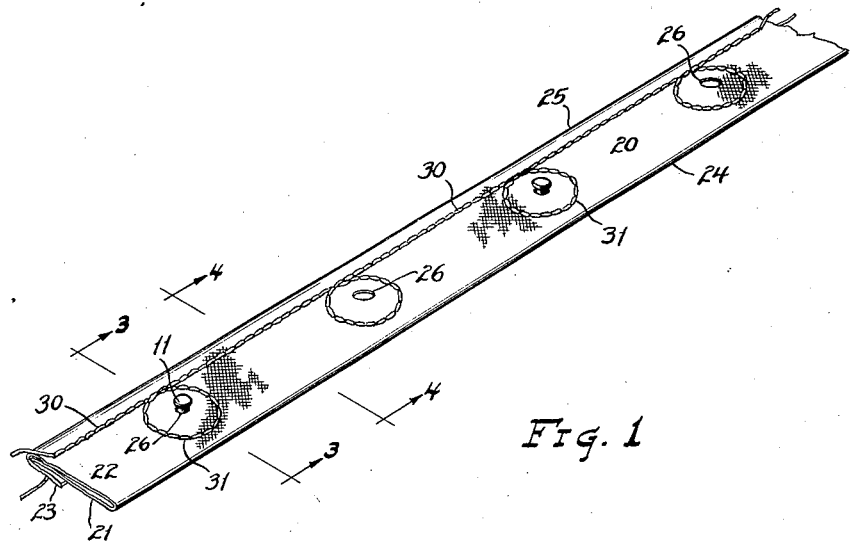

June 4, 1940.    J. F. HARTNETT    2,202,854
FASTENER TAPE
Filed Oct. 31, 1934

Inventor
John F. Hartnett,
By Bates, Golrick & Heare
Attorneys.

Patented June 4, 1940

2,202,854

UNITED STATES PATENT OFFICE 2,202,854

FASTENER TAPE

John F. Hartnett, Cleveland Heights, Ohio, assignor to Wilson Fastener Company, Cleveland, Ohio, a corporation of Ohio Application October 31, 1934, Serial No. 750,812

4 Claims. (Cl. 2—265)

This invention relates to strips of snap fastening members adapted for various purposes, for instance, to be attached to ladies' garments and serve as closures therefor. The strips are so made that the stud members carried by one strip may coact with socket members carried by the other. All of the stud members may be on one strip and all of the socket members on the other, or, if desired, studs and sockets may alternate on each strip, the strips in any case being so positioned for use that the sockets in one member register with the studs in the other.

The fastener member, whether stud or socket, is placed between two plies of fabric in registration with an opening through one of the plies. In the case of the stud members, the studs extend through these openings and in the case of the socket members, the sockets are aligned with the openings. In either case the fastener member is retained by annular stitching which passes through the two plies of fabric and snugly embraces the fastener.

It is an object of my invention to provide a fastener strip, of the type mentioned, which may be very cheaply constructed, and in which the successive annular stitching will be part of a continuous stitching which between the annular courses will be utilized to hold the plies of fabric together.

A fastener tape constructer according to this invention does not have any possibility of the annular stitching unraveling, or any loose threads between the successive annular courses, which in prior forms have required removal at a very material expense in the aggregate. According to my invention I stitch a course through the two plies of fabric and continue such course in a circular path about a fastener and then continue it to the next fastener and about it, and so on.

The operation of my stitching may be performed very rapidly, there are no loose threads between the successive annular courses, and there is a beneficial continuous line of stitching securing together the two plies of the tape.

I prefer to make the tape of a single strip of fabric which is folded on itself to present at least two zones between which the bodies of the fasteners lie, and the line of stitching passes through both zones.

My invention comprises the method of making the tape and the tape constructed by such method, all as illustrated in the drawing and hereinafter more fully described.

Figure 2:
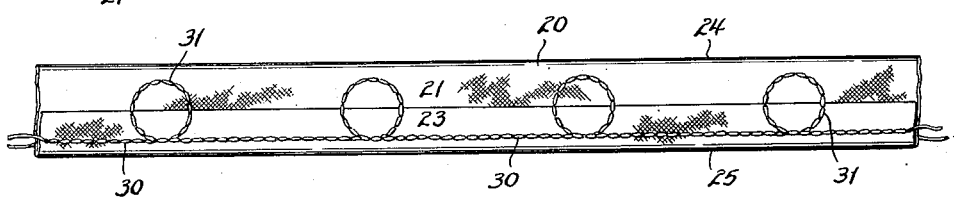
Figures 3, 4:
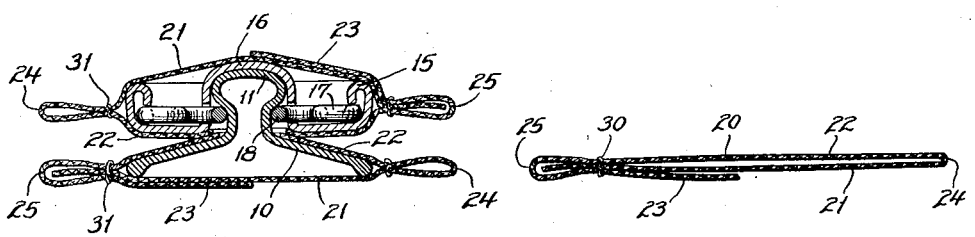
Figure 5:
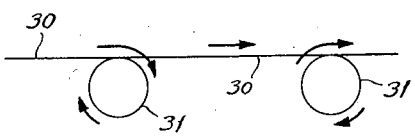

In the drawing, Fig. 1 is a perspective view of my fastener tape; Fig. 2 is a bottom plan thereof; Fig. 3 is a cross-section as indicated by the line 3—3 on Fig. 1, but taken through two tapes snapped together; Fig. 4 is a cross-section through the tape of Figs. 1 and 2 in a region between the fasteners; Fig. 5 is a diagram illustrating the course of the stitching in the sewing operation.

For convenience of illustration, I have shown in Fig. 1 the stud members and socket members alternatively positioned equidistantly on the tape. Such a construction has the advantage that only one style of tape need be produced, as suitable sections thereof attached to the garment or other article in the proper position will enable each stud member to register with a mating socket member. As heretofore stated, however, all of the studs may be on one tape and all of the sockets on another, and the tapes supplied in pairs.

As illustrated in Fig. 3, 10 indicates the stud fastener member, which has a disc-like base portion and a central hollow stud having a slightly enlarged head 11. The socket member coacting with this stud is shown as comprising a dish-shaped member 15 having a central hollow dome 16 of a size to receive the head 11 of the stud. A suitable spring wire 17 held within the dish of the socket member may have a semi-circular intermediate portion and two extreme S-shaped portions to provide free end arms 18 extending through openings in the dome 16 to engage the neck of the stud. This construction, however, is merely illustrative of any snap fastener pair which is adapted to be mounted between plies of fabric.

As shown in Figs. 1 to 4, the tape 20 is composed of a single strip of fabric having an extreme zone 21 for nearly the full width of the tape, a folded-over intermediate zone 22 and a narrow extreme zone 23 folded back onto the zone 21. The fasteners are placed equidistantly in a row between the two plies 22 and 21. I have shown the fastener in the central longitudinal region of the tape, that is to say, the same distance from each of the lines of fold 24 and 25, though this is optional. There is an equidistant row of openings 26 through the intermediate zone 22 of the tape and the fasteners are so placed between the two plies 21 and 22 that the studs extend through these openings or the domes register with them, as the case may be.

Now with the fasteners placed between the folded tape in registration with the previously formed holes therein, I pass a course of lock stitching, preferably in a straight line substantially tangent to the edge of the fastener, through the three plies of fabric caused by the overlapped zones 21, 22 and 23. This arrangement provides ample fabric to prevent the threads pulling through, even though the material of the strip be comparatively thin, to enable it to have desired flexibility. When this stitching reaches the end of the transverse diameter of the fastener it is diverted in a circular course 31, looping around the fastener and very close to it until a complete circle is made, where the stitching crosses the former course and then continues in another straight course 30 to the next fastener, where it makes another loop 31, and so on continuously.

The annular course of stitching is as close as possible to the edge of the fastener, and I have found it most satisfactory to make it so close that the sewing machine needle actually touches the fastener as it passes through the fabric. In the enlarged view, Fig. 3, the stitching, for clearness of illustration, is exaggerated as to its distance beyond the edge of the fastener.

It will be seen that my method of making the tape is adapted for continuous operation. The fasteners are placed in position between the two plies of tape, one of which is perforated, the stud members holding themselves in position in the perforations and the socket members being held (as by the temporary insertion of a stud member from the outside) and then the sewing machine operates continuously to stitch through the plies of fabric and loop around the successive fasteners.

As a result I have produced a tape in which each fastener is held in the desired position by snugly embracing annular stitching and at the same time the free zones of the fabric are continuously stitched to each other. It will also be noticed that the circular course of stitching extends across the free edge of the narrow extreme zone 23 if the same is employed and thus periodically binds that edge to the wide extreme zone 21. There are no free threads between successive annular courses to be removed, nor is any additional stitching necessary to hold all the parts together, the tape being thus ready for use as soon as produced.

I claim:

1. A fastener tape comprising two plies of fabric, a row of fasteners between the same, and a continuous course of stitching extending along a region between fasteners and then making a complete circle about the fastener and crossing itself and continuing to the next fastener and making a complete circle about it, and so on.

2. A fastener tape comprising a strip of fabric folded on itself to present an intermediate zone and relatively wide and narrow extreme zones, one of the extreme zones being nearly the width of the intermediate zone and the other extreme zone being of materially less width, the intermediate zone having a row of openings through it positioned equi-distantly, a row of fasteners placed between the zones and each facing the intermediate zone and centrally registering the openings therein, and a course of lock-stitching passing in a straight line through the three zones where they overlap in the region between the fasteners and at the fasteners making a continuous circular course about the fastener, such course passing through the three zones and thence across the free edge of the narrow extreme zone and in an arc through two zones and then back onto the three zones to the starting point where the stitching crosses itself and continues in a straight line to the next fastener.

3. A fastener tape comprising two surmounting plies of fabric, a row of fasteners between the plies registering with openings in one of the plies, and a single course of stitching which extends through the plies from fastener to fastener, and at each fastener completely encircles the perimeter by stitching which conforms to such perimeter and snugly embraces it, and which encircling line of stitches blends into a tangential portion of the course and has no definite ends.

4. A fastener tape comprising a strip of fabric folded on itself to present an intermediate zone and two extreme zones, a row of fasteners placed between the folds with their centers registering with openings in the intermediate zone and a single continuous course of stitching which has straight portions extending longitudinally through the three zones between the fasteners and circular portions at each fastener which are diverted to substantially enclose the fastener and definitely confine it, and wherein the circular portions blend into tangential portions of the course and have no definite ends.

JOHN F. HARTNETT.